United States Patent
Moy

[11] Patent Number: 5,680,728
[45] Date of Patent: Oct. 28, 1997

[54] POWER ACTUATOR FOR A VEHICLE WINDOW

[75] Inventor: Curtis T. Moy, St. Clair Shores, Mich.

[73] Assignee: Saturn Electronics & Engineering, Inc., Auburn Hills, Mich.

[21] Appl. No.: 405,469

[22] Filed: Mar. 16, 1995

[51] Int. Cl.$^6$ ..................................................... E05F 11/34
[52] U.S. Cl. ................... 49/324; 49/340; 49/341; 49/357
[58] Field of Search ................... 49/324, 334, 356, 49/340, 341, 357; 74/89.2, 89.14; 296/146, 42

[56] References Cited

U.S. PATENT DOCUMENTS

| | | |
|---|---|---|
| 1,644,691 | 10/1927 | Pritchard . |
| 2,237,576 | 4/1941 | Rakoczy . |
| 2,371,336 | 3/1945 | Levon . |
| 2,767,979 | 10/1956 | Hummert . |
| 3,020,039 | 2/1962 | Hynes et al. . |
| 3,320,698 | 5/1967 | Hummel . |
| 3,481,076 | 12/1969 | Bedard . |
| 3,534,630 | 10/1970 | Schwerdhofer . |
| 3,713,346 | 1/1973 | Chamberlain et al. . |
| 4,068,799 | 1/1978 | Brodin . |
| 4,186,524 | 2/1980 | Pelchat . |
| 4,226,136 | 10/1980 | Porter et al. . |
| 4,246,628 | 1/1981 | Ikemizu et al. . |
| 4,249,771 | 2/1981 | Gergoe et al. . |
| 4,305,228 | 12/1981 | Nelson . |
| 4,403,449 | 9/1983 | Richmond ................... 49/340 |
| 4,420,185 | 12/1983 | Bienert et al. . |
| 4,471,251 | 9/1984 | Yamashita . |
| 4,511,129 | 4/1985 | Kishino . |
| 4,534,233 | 8/1985 | Hamaguchi . |
| 4,860,493 | 8/1989 | Lense . |
| 4,866,882 | 9/1989 | Cappello . |
| 4,885,948 | 12/1989 | Thrasher, Jr. et al. . |
| 4,903,435 | 2/1990 | Bittmann et al. . |
| 4,918,865 | 4/1990 | Hirai . |
| 4,938,086 | 7/1990 | Nolte et al. . |
| 4,970,826 | 11/1990 | Richmond et al. . |
| 4,987,791 | 1/1991 | Nakahashi et al. . |
| 5,036,620 | 8/1991 | Beran et al. ................ 49/334 X |
| 5,040,430 | 8/1991 | Adam et al. . |
| 5,046,377 | 9/1991 | Wilkes et al. . |
| 5,090,261 | 2/1992 | Nakatsukasa . |
| 5,099,760 | 3/1992 | Schneider . |
| 5,140,771 | 8/1992 | Moy et al. . |
| 5,161,419 | 11/1992 | Moy et al. . |
| 5,203,113 | 4/1993 | Yagi . |
| 5,385,061 | 1/1995 | Moy et al. ................ 49/340 X |

FOREIGN PATENT DOCUMENTS

| | | |
|---|---|---|
| 0170989 | 2/1986 | European Pat. Off. . |
| 0339928 | 11/1989 | European Pat. Off. . |
| 3522706 | 1/1986 | Germany . |
| 3741615 | 6/1989 | Germany . |
| 11070 | 10/1911 | United Kingdom . |
| 531285 | 1/1941 | United Kingdom . |
| 624189 | 5/1949 | United Kingdom . |
| 688417 | 3/1953 | United Kingdom . |
| 2167120 | 5/1986 | United Kingdom . |
| 2169652 | 7/1986 | United Kingdom . |
| 2195392 | 4/1988 | United Kingdom . |
| 2212591 | 7/1989 | United Kingdom . |

Primary Examiner—Kenneth J. Dorner
Assistant Examiner—Curtis Cohen
Attorney, Agent, or Firm—Edward J. Timmer

[57] ABSTRACT

A direct drive power window actuator for remote opening and closing of a pivotal quarter window of an automotive vehicle comprising a reversible motor, a power transmitting gear device operatively connected with the motor at one end and with a rotary shaft at the other end for rotating the rotary shaft, and a linkage for converting the rotational torque of the rotary shaft into an opening-and-closing force for the window.

23 Claims, 3 Drawing Sheets

POWER ACTUATOR FOR A VEHICLE WINDOW

FIELD OF THE INVENTION

The present invention relates to a power actuator for an electrically operated vehicle window, more particularly to a power actuator for a swingably or pivotably mounted window such as a rear side or quarter window of a vehicle such as a van or the like.

BACKGROUND OF THE INVENTION

It is often desirable to provide a powered rear side or rear quarter window for ventilation purposes in vehicles, particularly vans and mini-vans. These rear side or quarter windows are generally swingably mounted and open outwardly of the vehicle body, and are typically remotely activated, as for example from the driver's seat.

Several types of vehicle power window actuators are known and used. Problems associated with these known types of window openers include their high cost, large and cumbersome size, weight and indirect drive arrangement employing cables with the motor being distant from the window. Thus, for example, U.S. Pat. No. 4,186,524 discloses a vehicle power window actuator for pivoting a glass view panel about an axis by means of back-and forth linear movement of a wire cable. The wire cable has a jack screw portion swaged to one end engaging a gear which is rotated by an electric motor (which normally is placed in a location removed from the window such as in the trunk to produce linear movement of the cable. The other end of the wire cable is swadge-attached to a rigid curved rod terminating in a ball-shaped end portion. The curved end is housed in an arcuate hollow support assembly which is attached to the vehicle body adjacent the movable edge portion of the window panel so as to direct the end portion of the curved rod against the panel. A connector assembly between the end portion of the curved rod and the window accommodates linear movement of the ball-shaped portion in a direction parallel with the plane of the glass as the window pivots outward. In addition, the end portion moves with and rotates with respect to the glass.

Likewise, U.S. Pat. No. 4,918,865 discloses a power window opener for operation of a quarter window of an automobile comprising an actuating device, an electric motor, and pull cable transmitting power from the motor (which is physically removed from the actuating device) to the actuating device. The actuating device has a pulley, a rotary shaft connected to the pulley, and a link mechanism for converting a rotational torque of the rotary shaft into an opening-and-closing forge for a wing member of the window. The pull cables are connected with the pulley so that reciprocal pull operation through the motor causes reciprocal rotation of the pulley.

There is thus a need for a relatively simple, light weight, direct drive, inexpensive, and compact actuator for swingably mounted rear quarter power windows of vehicles such as, for example, vans and mini-vans. The present invention provides such an actuator.

SUMMARY OF THE INVENTION

In accordance with the present invention there is provided a vehicle window direct drive power actuator for pivoting a window outwardly of a vehicle body about an axis. The actuator comprises driving means comprised of a reversible electric motor; power transmitting means engaged with the driving means at one end and with a rotary shaft for rotating said rotary shaft at the other end, and a window linkage assembly mounted on said window and engages with said rotary shaft for converting the rotational torque of the rotary shaft into an opening-and-closing force for the window. The reversible motor, power transmitting means, and rotary shaft are disposed in a housing. The power transmitting means comprise a gear train engaged at one end thereof with the driving means and at the other end with the rotary shaft. The rotary shaft is in turn engaged with the window linkage assembly. The linkage assembly converts the rotational torque of the rotary shaft in a certain direction into a window opening force and a rotational torque in the opposite direction, caused by reversing the driving means, into a window closing force.

The actuator of the instant invention is a direct drive actuator. By direct drive actuator is meant that the driving device (motor) is located adjacent the window and transmits power to the window linkage assembly by means of gears and shafts, and, unlike the indirect drive actuators disclosed in U.S. Pat. Nos. 4,186,524 and 4,918,865, no cables are present as power transmitting members. This results in a smaller, simpler, less cumbersome and generally more economical actuator.

DETAILED DESCRIPTION OF THE PREFERRED EMBODIMENT

Figure 1:
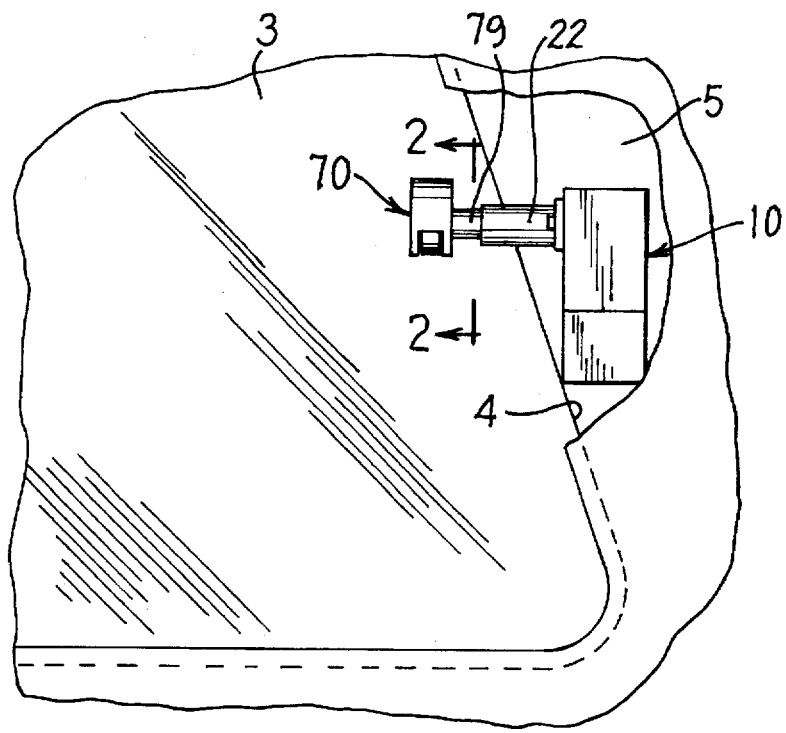
FIG. 1 is a partially cut away side elevational view showing the window actuator mounted in the interior of the vehicle and attached to a vehicle window with the window in the closed position.

As shown in FIG. 1 of the drawings, the power window actuator 10 is mounted in the interior of a vehicle on a side body panel portion of the vehicle by attachment means such as bolts, screws, and the like. More particularly the actuator 10 is mounted on the side sheet metal, for example, on the side post or pillar 5, adjacent the rear edge 4 of the rear side or quarter window 3. The quarter window 3 is mounted on the side body panel portion to swing laterally outward with respect to the body about an axis along the forward edge of the window. The swinging movement is controlled by window power actuator 10.

Figure 4:
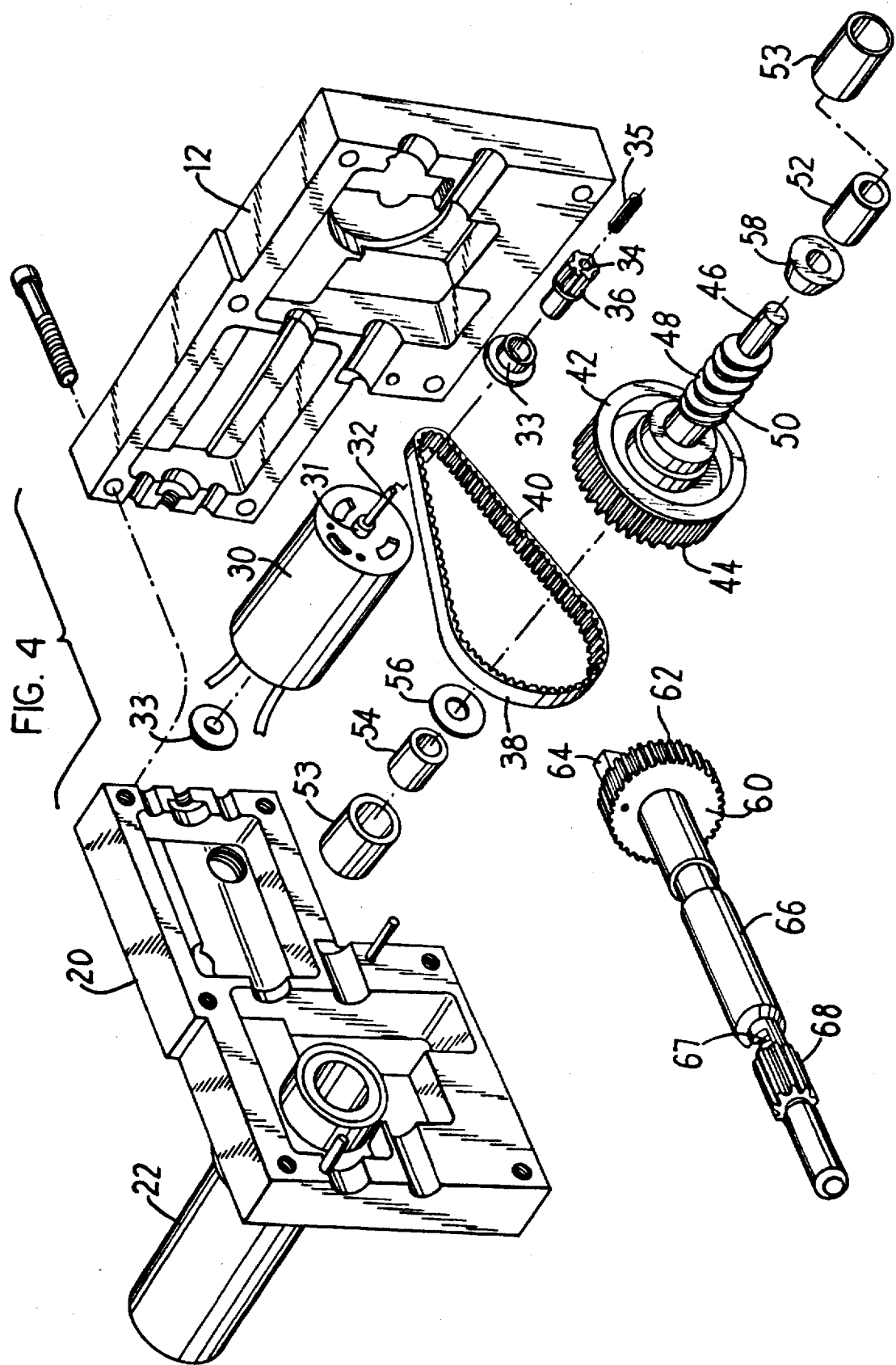
FIG. 4 is an exploded perspective view of the housing, motor, and gears of the actuator.

The window actuator 10 comprises a housing 11. For ease of manufacture and installation, housing 11, as best illustrated in FIG. 4, has two halves 12,20. Disposed in the housing is a small electric motor 30 having motor journals 31 and an output shaft 32. Resilient bushings 33 with a flange are mounted on the motor journals 31 and function to isolate the motor from the housing thereby reducing noise and vibration. The motor 30 is reversible and has circuit means associated therewith, including switch means for selectively activating the motor alternately in either direction at a switch location remote from the motor. Output shaft 32 has a gear 34 at one end thereof which rotates with the rotation of output shaft 32. Gear 34 has radially extending teeth 36. In a preferred embodiment gear 34 is press fit on output shaft 32 with spring pin bushing 35.

Drive belt 38 is mounted on gear 34 and gear 42. Teeth 40 mesh with and engage radially extending teeth 36 of gear 34 and radially extending teeth 44 of gear 42. Drive belt 38 has a plurality of teeth 40 on its inner surface.

Gear 42 is mounted on shaft 46 and rotates with shaft 46. Worm 48 having teeth 50 is also mounted on shaft 46 and rotates therewith. Worm 48 is coaxial with gear 42 and is axially spaced therefrom on shaft 46. The ends of shaft 46 are rotatably disposed in tubular bearings 52, 54. Washers 56 and 58 are disposed intermediate gear 42 and bearing 54 and worm 48 and bearing 52 respectively. In a preferred embodiment resilient bushings 53 are disposed over tubular bearings 52, 54.

Figure 5:
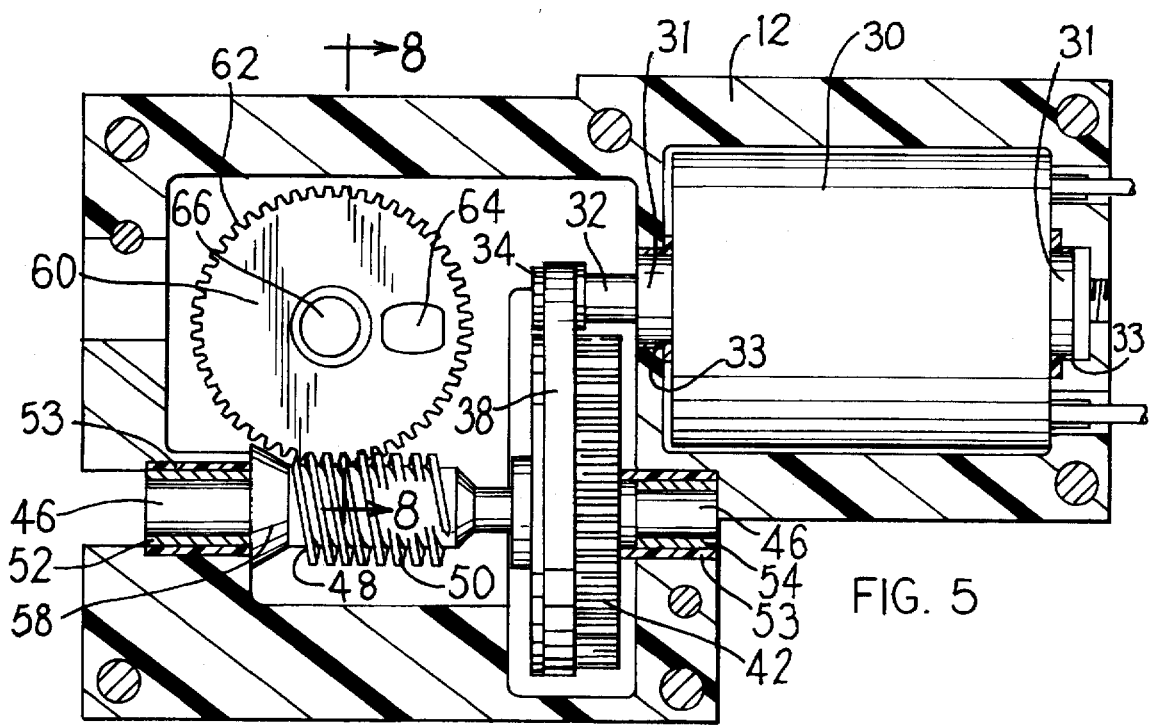
FIG. 5 is a top plan view partially in section of the motor and gears disposed in one half of the housing.
Figure 8:
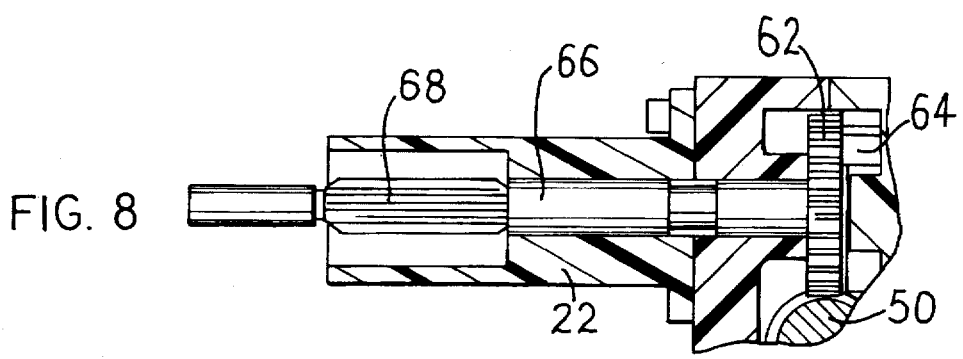
FIG. 8 is a sectional view taken along line 8—8 in FIG. 5.

As best illustrated in FIG. 5 the teeth 50 of worm 48 mesh with the teeth 62 of worm gear 60. Worm gear 60 is mounted on one end of output shaft 66 and rotates therewith. In a preferred embodiment worm gear 60 has internal serrations and is press fit on output shaft 66. As illustrated in FIG. 8, output shaft 66 is rotatably disposed in elongated hollow tubular bearing 22 which is part of housing half 20.

Switching on of the motor 30 results in rotation of output shaft 32. Rotation of output shaft 32 results in rotation of gear 34. As gear 34 rotates its teeth 36 engage teeth 40 of drive belt 38 and move drive belt 38. Movement of drive belt 38 results in teeth 40 of belt 38 engaging teeth 44 of gear 42 thereby rotating gear 42. Rotation of gear 42 causes rotation of shaft 46 and of worm 48. Upon rotation of worm 48 its teeth 50 engage teeth 62 of output gear 60 thereby rotating output gear 60. Rotation of gear 60 results in rotation of rotary shaft 66.

Rotation of rotary shaft 66 causes rotation of splined section 68. Splined section 68 engages a corresponding splined section in the interior of hollow tubular member 79 of the window linkage assembly 70 thereby actuating the window linkage assembly. The window linkage assembly 70 comprises a first link member 71 and a second link member 72. The first link member 71 has a base end with a hollow tubular member 79 extending therefrom and an end provided with pin-joint-hole 74. The hollow tubular member has a splined portion in the interior thereof which engages splined portion 68 of shaft 66.

Figure 3:
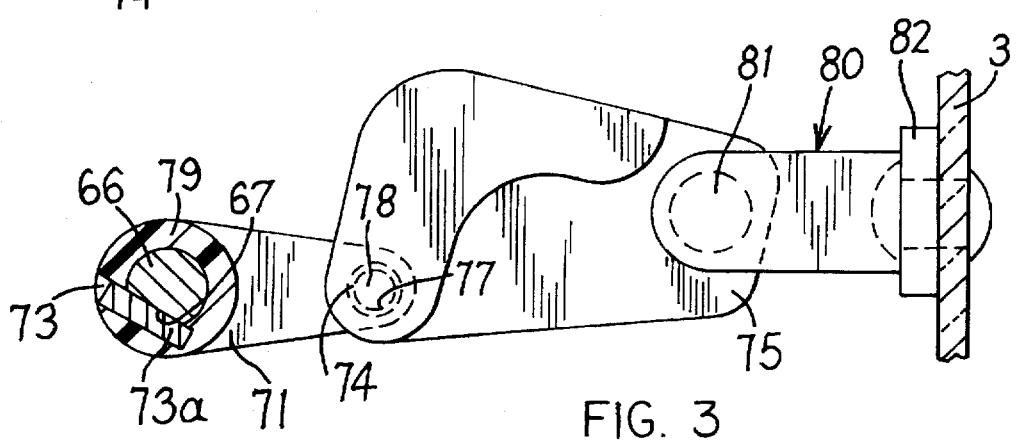
FIG. 3 is similar to FIG. 2 except with the window in the open position and the window linkage mechanism in an extended position.

In the embodiment illustrated in FIG. 3 the rotary shaft 66 is locked against longitudinal movement in hollow tubular member 79 by a transversely extending roll pin 73a which is disposed in a transversely extending cavity 73 in member 79. Roll pin 73a passes through a complimentary shaped transversely extending cutout portion 67 in rotary shaft 66 which cutout portion 67 is aligned with cavity 73.

The second link member 72 comprises a main plate 75 and a rib 76 projecting in a lateral direction. The rib 76 has a substantially L-shaped form and a Substantially L-shaped cross-section and functions as a reinforcing member. The second link member 72 has an end 72a having a clevice-like form provided with a pin-joint hole 77. By aligning this pin-joint hole 77 with the pin-joint hole 74 of the first link member 71 and then inserting a pin 78 through the holes 77 and 74, the first link member 71 and the second link member 72 are rotatably joined together. The second link member 72 is provided with joint means at the free end thereof for attachment to attaching means 80 fixed to window glass pane 3. The attaching means 80 comprise, in the embodiment illustrated, a mounting bracket comprised of a bracket arm 83 and bracket plate 82 attached to window glass pane 3. The joint means may, as illustrated, be ball joint means comprising a ball joint 81 pivotally inserted into a socket of attaching means 80.

Figure 2:
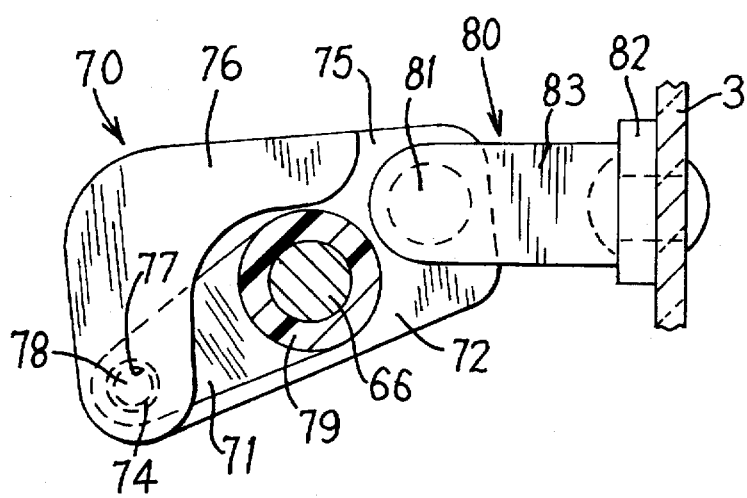
FIG. 2 is an enlarged view taken along line 2—2 in FIG. 1 showing the window linkage mechanism with the window in the closed position.

In operation rotation of rotary shaft 66 in one direction results in rotation of the first link member in the same direction. Thus, for example, clockwise rotation of rotary shaft 66 causes rotation of first link member 71 in a clockwise direction. The second link member 72 is pushed to extend, as shown in FIG. 3, and open the window. Counterclockwise rotation of rotary shaft 66 results in counterclockwise rotation of the first link member 71. The second link member 72 is pulled to a folded position, as shown in FIG. 2, to close the window.

Figure 6:
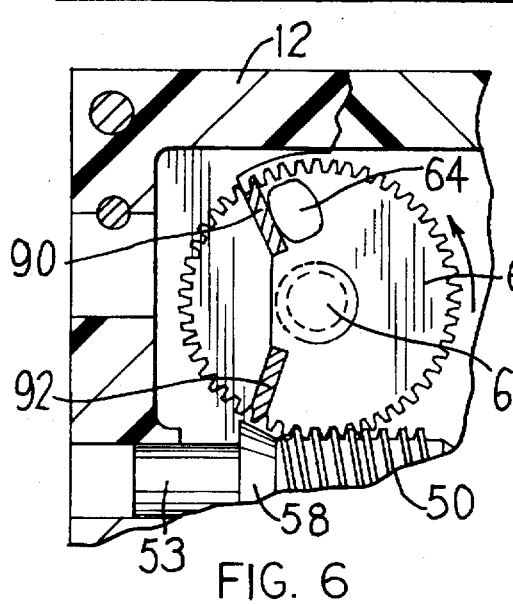
FIG. 6 is partial sectional view showing the stop member engaging the stop pad.
Figure 7:
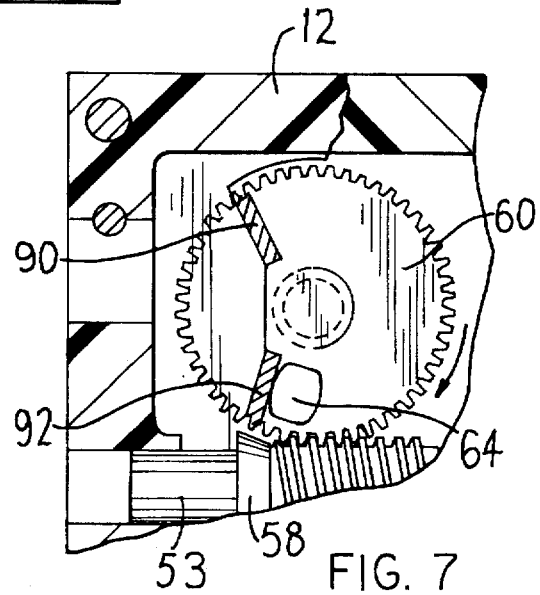
FIG. 7 is a view similar to FIG. 6 except the stop member is engaging the other stop pad.

As best illustrated in FIGS. 5–7, gear 60 has a stop member 64 on its face. As best illustrated in FIGS. 6 and 7 stop member cooperates with resilient stop pads 90, 92 to limit rotation of gear 60 and, therefore, of shaft 66. As illustrated in FIG. 6, the counterclockwise rotation of gear 60 is limited by stop member 64 contacting stop pad 90. As illustrated in FIG. 7 the clockwise rotation of gear 60 is limited by stop member 64 contacting stop pad 92. This stop mechanism limits the opening and closing motion of the window. This particular arrangement of stop member 64 and stop pads 90,92 limits or controls the pivotal travel of the window by limiting or controlling the degree of rotation of shaft 66, and also reduces shock loading to the gear train and impact noise upon stop member 64 contacting stop pads 90,92.

Variations and modifications of the present invention are possible without departing from the spirit and scope as defined in the appended claims.

What is claimed is:

1. A direct drive window actuator for pivotally opening and closing a pivotal vehicle window comprising:

a housing;

reversible electric motor disposed in said housing containing an output shaft with a first gear rotatable with said output shaft;

a rotary shaft having a longitudinal axis and rotatable about said axis at least partially disposed in said housing, said shaft having a worm gear at one end;

a plurality of gears disposed in said housing intermediate said output shaft and said rotary shaft including a second gear, a drive belt engaged with said first gear and with said second gear, a worm coaxial and rotatable with said second gear and engaged with said worm gear;

stop means for controlling extent of rotation of said rotary shaft; and linkage means operably connecting said rotary shaft to said window, said linkage means converting the rotational movement of said rotary shaft into an opening and closing movement of said window.

2. The actuator of claim 1 wherein said linkage means comprise a first link engaged with the other end of said rotary shaft, and a second link pivotally attached to said first link at one end and pivotally attached to attaching means on said window at the other end.

3. The actuator of claim 2 wherein said housing is mounted in the interior of said vehicle adjacent the free edge of said window.

4. The actuator of claim 2 wherein said attaching means are mounted on the window pane of said window.

5. The actuator of claim 1 wherein said stop means comprise a protruding stop member on the face of said worm gear and at least one stop in said housing against which said stop member abuts upon rotation of said worm gear.

6. The actuator of claim 5 wherein said stop is comprised of a resilient stop pad.

7. The actuator of claim 1 wherein said window is a side or quarter window in a van or minivan.

8. The actuator of claim 1 wherein said electric motor has a motor journal on each end thereof, each motor journal being mounted in a resilient bushing.

9. The actuator of claim 1 wherein said second gear and said worm gear are disposed on a third shaft and are rotatable therewith.

10. The actuator of claim 9 wherein the ends of said third shaft mounted in resilient bushings.

11. The actuator of claim 1 wherein said first gear is mounted on said output shaft by means of a spring pin bushing.

12. A direct drive window actuator for pivotally opening and closing a pivotal vehicle window comprising:

a housing;

reversible electric motor disposed in said housing containing an output shaft with a first gear rotatable with said output shaft;

a rotary shaft having a longitudinal axis and rotatable about said axis at least partially disposed in said housing;

a plurality of gears disposed in said housing intermediate said output shaft and said rotary shaft including a second gear, a drive belt engaged with said first gear and with said second gear, a third gear coaxial and rotatable with said second gear and engaged with a fourth gear disposed on said rotary shaft;

stop means for controlling extent of rotation of said rotary shaft; and linkage means operably connecting said rotary shaft to said window, said linkage means converting the rotational movement of said rotary shaft into an opening and closing movement of said window.

13. The actuator of claim 12 wherein said fourth gear is a worm gear and said third gear is a worm.

14. The actuator of claim 12 wherein said linkage means comprise a first link engaged with the other end of said rotary shaft, and a second link pivotally attached to said first link at one end and pivotally attached to attaching means on said window at the other end.

15. The actuator of claim 14 wherein said housing is mounted in interior of said vehicle adjacent the free edge of said window.

16. The actuator of claim 14 wherein said attaching means are mounted on the window pane of said window.

17. The actuator of claim 12 wherein said stop means comprise a protruding stop member on the face of said worm gear and at least one stop in said housing against which said stop member abuts upon rotation of said worm gear.

18. The actuator of claim 17 wherein said stop is comprised of a resilient stop pad.

19. The actuator of claim 12 wherein said window is a side or quarter window in a van or minivan.

20. The actuator of claim 12 wherein said housing includes a hollow tubular extension in which is rotatably disposed at least a portion of said rotary shaft.

21. The actuator of claim 20 which includes means for preventing longitudinal movement of said rotary shaft in said hollow tubular member.

22. A direct drive window actuator for pivotally opening and closing a pivotal vehicle window comprising:

a housing including a hollow tubular extension;

reversible electric motor disposed in said housing containing an output shaft with a first gear rotatable with said output shaft;

a rotary shaft having a longitudinal axis and rotatable about said axis at least partially disposed in said extension, at least a portion of said rotary shaft being disposed in said extension;

means for preventing longitudinal movement of said rotary shaft in said extension;

a plurality of gears disposed in said housing intermediate said output shaft and said rotary shaft including a second gear, a drive belt engaged with said first gear and with said second gear, a third gear coaxial and rotatable with said second gear and engaged with a fourth gear disposed on said rotary shaft; and linkage means operably connecting said rotary shaft to said window, said linkage means converting the rotational movement of said rotary shaft into an opening and closing movement of said window.

23. The actuator of claim 22 wherein said means comprises a transversely extending blind cavity in said hollow tubular extension a transversely extending cutout portion in said rotary shaft, and a roll pin disposed in said blind cavity and seated in said cutout portion.

* * * * *